United States Patent
Font Freide et al.

(10) Patent No.: US 7,037,947 B2
(45) Date of Patent: May 2, 2006

(54) FISCHER-TROPSCH SYNTHESIS PROCESS CARRIED OUT ON A FLOATABLE STRUCTURE

(75) Inventors: Josephus Johannes Helena Maria Font Freide, Guildford (GB); John Richard Hensman, Letchworth (GB); David Newton, Farnham (GB)

(73) Assignees: BP Exploration Operating Company Limited, London (GB); Davy Process Technology Limited, London (GB)

( * ) Notice: Subject to any disclaimer, the term of this patent is extended or adjusted under 35 U.S.C. 154(b) by 96 days.

(21) Appl. No.: 10/476,255

(22) PCT Filed: May 17, 2002

(86) PCT No.: PCT/GB02/02266

§ 371 (c)(1),
(2), (4) Date: Dec. 17, 2003

(87) PCT Pub. No.: WO02/096838

PCT Pub. Date: Dec. 5, 2002

(65) Prior Publication Data

US 2004/0122114 A1 Jun. 24, 2004

(30) Foreign Application Priority Data

May 25, 2001 (GB) .................. 0112786.9

(51) Int. Cl.
*C07C 27/00* (2006.01)
*E02B 17/08* (2006.01)
*E02D 23/02* (2006.01)

(52) U.S. Cl. ............ 518/700; 702/705; 702/706; 702/712; 405/203; 405/206

(58) Field of Classification Search ........... 518/700, 518/702, 706, 705, 712; 405/203, 206
See application file for complete search history.

(56) References Cited

U.S. PATENT DOCUMENTS 6,090,859 A 7/2000 Howsmon et al.

FOREIGN PATENT DOCUMENTS

| GB | 728543 | 4/1955 |
| WO | WO 97/12118 | 4/1997 |
| WO | WO 00/34414 | 6/2000 |
| WO | WO 01/38269 A1 | 5/2001 |

*Primary Examiner*—J. Parsa
(74) *Attorney, Agent, or Firm*—Nixon & Vanderhye

(57) ABSTRACT

A process for the conversion of natural gas to higher hydrocarbons in a system comprising (1) a synthesis gas production unit and (2) a Fischer-Tropsch synthesis unit comprising at least one high shear mixing zone and a reactor vessel wherein the units are located abroad a floatable structure. The process comprises the steps of: (a) converting the natural gas to synthesis gas in the synthesis gas production unit; and (b) converting the synthesis gas to higher hydrocarbons, at an elevated temperature and pressure, in the Fischer-Tropsch synthesis unit by (i) passing synthesis gas and a suspension comprising a particulate Fischer-Tropsch catalyst suspended in a liquid medium through the high shear mixing zone(s) wherein the synthesis gas is broken down into gas bubbles and/or irregularly shaped gas voids which are dispersed in the suspension, and (ii) discharging suspension containing the dispersed gas bubbles and/or irregularly shaped gas voids from the high shear mixing zone(s) into the reactor vessel.

35 Claims, No Drawings

FISCHER-TROPSCH SYNTHESIS PROCESS CARRIED OUT ON A FLOATABLE STRUCTURE

The present invention relates to a process for the conversion of carbon monoxide and hydrogen (synthesis gas) to liquid hydrocarbon products in the presence of a Fischer-Tropsch catalyst.

BACKGROUND OF THE INVENTION

In the Fischer-Tropsch synthesis reaction a gaseous mixture of carbon monoxide and hydrogen is reacted in the presence of a catalyst to give a hydrocarbon mixture having a relatively broad molecular weight distribution. This product is predominantly straight chain, hydrocarbons which typically have a chain length of more than 2 carbon atoms, for example, more than 5 carbon atoms.

Fischer-Tropsch processes are known which employ slurry bubble columns in which the catalyst is primarily distributed and suspended in the slurry by the energy imparted from the synthesis gas rising from the gas distribution means at the bottom of the slurry bubble column as described in, for example, U.S. Pat. No. 5,252,613.

The Fischer-Tropsch process may also be operated by passing a stream of the liquid medium through a catalyst bed to support and disperse the catalyst, as described in U.S. Pat. No. 5,776,988. In this approach the catalyst is more uniformly dispersed throughout the liquid medium allowing improvements in the operability and productivity of the process to be obtained.

We have recently found that a Fischer-Tropsch process may be operated by contacting synthesis gas with a suspension of catalyst in a liquid medium in a system comprising at least one high shear mixing zone and a reactor vessel. The suspension is passed through the high shear mixing zone(s) where synthesis gas is mixed with the suspension under conditions of high shear. The shearing forces exerted on the suspension in the high shear mixing zone(s) are sufficiently high that the synthesis gas is broken down into gas bubbles and/or irregularly shaped gas voids. Suspension having gas bubbles and/or irregularly shaped gas voids dispersed therein is discharged from the high shear mixing zone(s) into the reactor vessel where the majority of the conversion of synthesis gas to liquid hydrocarbon products takes place. The suspension present in the reactor vessel is under such highly turbulent motion that any irregularly shaped gas voids dispersed therein are constantly coalescing and fragmenting over a rapid time frame, for example, over a period of up to 500 ms. The transient nature of these irregularly shaped gas voids results in improved heat transfer and mass transfer of gas into the liquid phase of the suspension when compared with a conventional slurry bubble column reactor. This process is described in WO 0138269 (PCT patent application number GB 0004444) which is herein incorporated by reference.

DESCRIPTION OF THE INVENTION

Natural gas is often produced in remote locations where it may not be economic to install gas pipelines to transport the natural gas from its production site. Where these remote locations are either close to shore or are off-shore, it would be desirable to convert the natural gas to liquid hydrocarbons. Such liquid hydrocarbons are more readily transported than natural gas, for example, by liquid pipeline or by tanker. It would be advantageous to convert the natural gas to liquid hydrocarbons aboard a process plant located offshore which can subsequently be moved to another production site. The process plant may be assembled aboard a floatable structure at an industrialized location which may be distant from the remote production site. It is envisaged that the process plant may be constructed in modules and that these modules may be located on separate floatable structures for ease of transportation to the production site. Preferably, the modules are mounted on skids. A further advantage of such offshore process plants is that they can be used in locations where there are no feasible means for creating land-based foundations for a process plant.

Accordingly, the present invention relates to a process for the conversion of natural gas to higher hydrocarbons in a system comprising (1) a synthesis gas production unit and (2) a Fischer-Tropsch synthesis unit comprising at least one high shear mixing zone and a reactor vessel wherein the units are located aboard a floatable structure, and the process comprises the steps of:
  (a) converting the natural gas to synthesis gas in the synthesis gas production unit;
  (b) converting the synthesis gas to higher hydrocarbons, at an elevated temperature and pressure, in the Fischer-Tropsch synthesis unit by (i) passing synthesis gas and a suspension comprising a particulate Fischer-Tropsch catalyst suspended in a liquid medium through the high shear mixing zone(s) wherein the synthesis gas is broken down into gas bubbles and/or irregularly shaped gas voids which are dispersed in the suspension, and (ii) discharging suspension containing the dispersed gas bubbles and/or irregularly shaped gas voids from the high shear mixing zone(s) into the reactor vessel.

In a further aspect of the present invention there is provided a system for converting natural to higher hydrocarbons aboard a floatable structure, said system comprising (a) a synthesis gas production unit and (b) a Fischer-Tropsch synthesis unit comprising (i) at least one high shear mixing zone and (ii) a reactor vessel, said high shear mixing zone(s) having a first inlet for receiving a suspension comprising a particulate Fischer-Tropsch catalyst suspended in a liquid medium, a second inlet for receiving synthesis gas and an outlet in communication with said reactor vessel for discharging suspension containing dispersed gas bubbles and/or irregularly shaped gas voids into said reactor vessel.

Suitably, the system is located on a deck of the floatable structure.

Suitably, a well stream produced from an offshore oil or gas field may be passed to a gas separation unit on the floatable structure where natural gas is separated from the well stream and is fed to the synthesis gas production unit. Where the well stream is from a gas field, the gas is separated from water and/or gas field condensate in the gas separation unit. Where the well stream is from an oil field, the gas is separated from oil and water in the gas processing unit. Preferably, the natural gas is passed to an absorption unit on the floatable structure, prior to being fed to the synthesis gas production unit. In the absorption unit, sulfur, for example, in the form of hydrogen sulfide is removed from the natural gas.

The structure may be floating when in operation in which case the floatable structure is suitably moored or anchored to the sea floor. However, it is also envisaged that the structure may be beached in shallow waters. Preferably, the beached structure is capable of being re-floated so that it can be transported to another natural gas production site.

The floatable structure may be a platform, a jackup, an FPSO unit (FPSO= "Floating Production, Storage and Offloading") including production vessels, and ships (for example, shuttle tankers), an FSU unit (FSU="Floating Storage Unit") including storage vessels, a semisubmersible platform and the like. Where the floatable structure is a ship (for example, a shuttle tanker), the ship can be semi-permanently or permanently moored. It is envisaged that the ship may be sea-going i.e. is capable of weathering stormy conditions. Preferably, the ship has storage compartments for the higher hydrocarbons.

Where the system is located aboard a floating structure it is essential that either the floating structure is maintained in an adequately stable position for operation of the process of the present invention or the reactor system is adapted so that the process is capable of being operated under unstable conditions. Where the reactor system is located aboard a ship, the process of the present invention is preferably operated with the ship moored in a sheltered location, where the ship and hence operation of the process of the present invention will be less affected by pitch and roll. Alternatively, the system aboard the ship may be adapted so that the process is capable of being operated under unstable conditions.

Where the floating structure is a production vessel, ship or storage vessel, the floating structure may be suitably connected to an underwater loading buoy as described in WO 97/12118 which is herein incorporated by reference.

The synthesis gas may be prepared in the synthesis gas production unit using any of the processes known in the art including partial oxidation of natural gas, steam reforming, gas heated reforming, microchannel reforming (as described in, for example, U.S. Pat. No. 6,284,217 which is herein incorporated by reference), plasma reforming, autothermal reforming and any combination thereof. A discussion of a number of these synthesis gas production technologies is provided in "Hydrocarbon Processing" V78, N.4, 87–90, 92–93 (April 1999) and "Petrole et Techniques", N. 415, 86–93 (July–August 1998). It is also envisaged that the synthesis gas may be obtained by catalytic partial oxidation of natural gas in a microstructured reactor as exemplified in "IMRET 3: Proceedings of the Third International Conference on Microreaction Technology", Editor W Ehrfeld, Springer Verlag, 1999, pages 187–196. Alternatively, the synthesis gas may be obtained by short contact time catalytic partial oxidation of natural gas as described in EP 0303438. Preferably, the synthesis gas is obtained via a "Compact Reformer" process as described in "Hydrocarbon Engineering", 2000, 5, (5), 67–69; "Hydrocarbon Processing", 79/9, 34 (September 2000); "Today's Refinery", 15/8, 9. (August 2000); WO 99/02254; and WO 200023689.

Preferably, the ratio of hydrogen to carbon monoxide in the synthesis gas produced in the synthesis gas production unit is in the range of from 20:1 to 0.1:1, especially 5:1 to 1:1 by volume, typically 2:1 by volume.

Suitably, the Fischer-Tropsch synthesis unit employed in the process of the present invention may be a system as described in WO 0138269 (PCT patent application number GB 0004444) comprising at least one high shear mixing zone and a reactor vessel.

Suitably, the volume of the reactor vessel of the Fischer-Tropsch synthesis unit is less than 2000 $m^3$, preferably less than 1325 $m^3$ for a plant having a liquid capacity of 5,000 to 15,000 barrels per day.

Preferably, the reactor vessel of the Fischer-Tropsch synthesis unit is a tank reactor or a tubular loop reactor comprising a tubular loop conduit, as described in WO 0138269 (PCT patent application number GB 0004444).

For avoidance of doubt, conversion of synthesis gas to higher hydrocarbons may be initiated in the high shear mixing zone(s). However, it is believed that the majority of the conversion of synthesis gas to higher hydrocarbons occurs in the reactor vessel where the suspension is under highly turbulent motion.

Suitably, the shearing forces exerted on the suspension in the high shear mixing zone(s) of the Fischer-Tropsch production unit are sufficiently high that at least a portion of the synthesis gas is broken down into gas bubbles having diameters in the range of from 1 μm to 10 mm, preferably from 30 μm to 3000 μm, more preferably from 30 μm to 300 μm.

Without wishing to be bound by any theory, it is believed that any irregularly shaped gas voids are transient in that they are coalescing and fragmenting on a rapid time scale, for example, over a period of up to 500 ms. The gas voids have a wide size distribution with smaller gas voids having an average diameter of 1 to 2 mm and larger gas voids having an average diameter of 10 to 15 mm.

The high shear mixing zone(s) of the Fischer-Tropsch synthesis unit may be located inside or outside the reactor vessel or may project through the walls of the reactor vessel. Where the high shear mixing zone(s) projects through the walls of the reactor vessel it may be necessary to recycle suspension from the reactor vessel to the high shear mixing zone(s) through a slurry line(s). Preferred arrangements of the high shear mixing zone(s) and the reactor vessel are as described in WO 0138269 (PCT patent application number GB 0004444).

Suitably, the volume of suspension present in the high shear mixing zone(s) of the Fischer-Tropsch synthesis unit is substantially less than the volume of suspension present in the reactor vessel, for example, less than 20%, preferably less than 10% of the volume of suspension present in the reactor vessel.

The high shear mixing zone(s) of the Fischer-Tropsch synthesis unit may comprise any device suitable for intensive mixing or dispersing of a gaseous stream in a suspension of solids in a liquid medium, for example, a rotor-stator device, an injector-mixing nozzle or a high shear pumping means.

An advantage of the system of the present invention, where the structure is floating, is that the operation of the high shear mixing zone(s) of the Fischer-Tropsch synthesis unit is independent of any movement (pitch or roll) of the structure. Therefore, the process of the present invention may be operated even under adverse sea conditions.

The injector-mixing nozzle(s) can advantageously be executed as a venturi tube (c.f. "Chemical Engineers' Handbook" by J. H. Perry, $3^{rd}$ edition (1953), p.1285, FIG. 61), preferably an injector mixer (c.f. "Chemical Engineers' Handbook" by J H Perry, $3^{rd}$ edition (1953), p 1203, FIG. 2 and "Chemical Engineers' Handbook" by R H Perry and C H Chilton $5^{th}$ edition (1973) p 6–15, FIGS. 6–31) or most preferably as a liquid-jet ejector (c.f. "Unit Operations" by G G Brown et al, $4^{th}$ edition (1953), p.194, FIG. 210). Alternatively, the injector-mixing nozzle(s) may be executed as a venturi plate. The venturi plate may be positioned transversely within an open ended conduit which discharges suspension containing gas bubbles and/or irregularly shaped gas voids dispersed therein into the reactor vessel. Preferably, synthesis gas is injected into the open ended conduit downstream of the venturi plate, for example, within 1 metres, preferably, within 0.5 metres of the venturi plate.

The injector-mixing nozzle(s) may also be executed as a "gas blast" or "gas assist" nozzle where gas expansion is used to drive the nozzle (c.f. "Atomisation and Sprays" by Arthur H Lefebvre, Hemisphere Publishing Corporation, 1989). Where the injector-mixing nozzle(s) is executed as a "gas blast" or "gas assist" nozzle, the suspension of catalyst is fed to the nozzle at a sufficiently high pressure to allow the suspension to pass through the nozzle while the synthesis gas is fed to the nozzle at a sufficiently high pressure to achieve high shear mixing within the nozzle.

The high shear mixing zone(s) of the Fischer-Tropsch synthesis unit may also comprise a high shear pumping means, for example, a paddle or propeller having high shear blades positioned within an open ended conduit which discharges suspension containing gas bubbles and/or irregularly shaped gas voids into the reactor vessel. Preferably, the high shear pumping means is located at or near the open end of the conduit, for example, within 1 metre, preferably within 0.5 metres of the open end of the conduit. Synthesis gas may be injected into the conduit, for example, via a sparger, located immediately upstream or downstream, preferably upstream of the high shear pumping means, for example, within 1 metre, preferably, within 0.5 metres of the high shear pumping means. Without wishing to be bound by any theory, the injected synthesis gas is broken down into gas bubbles and/or irregularly shaped gas voids by the fluid shear imparted to the suspension by the high shear pumping means.

Where the high shear mixing zone(s) of the Fischer-Tropsch synthesis unit is executed as a venturi nozzle (either a venturi tube or as a venturi plate), the pressure drop of the suspension over the venturi nozzle is typically in the range of from 1 to 40 bar, preferably 2 to 15 bar, more preferably 3 to 7 bar, most preferably 3 to 4 bar. Preferably, the ratio of the volume of gas ($Q_g$) to the volume of liquid ($Q_l$) passing through the venturi nozzle is in the range 0.5:1 to 10:1, more preferably 1:1 to 5:1, most preferably 1:1 to 2.5:1, for example, 1:1 to 1.5:1 (where the ratio of the volume of gas ($Q_g$) to the volume of liquid ($Q_l$) is determined at the desired reaction temperature and pressure).

Where the high shear mixing zone(s) of the Fischer-Tropsch synthesis unit is executed as a gas blast or gas assist nozzle, the pressure drop of gas over the nozzle(s) is preferably in the range 3 to 100 bar and the pressure drop of suspension over the nozzle is preferably in the range of from 1 to 40 bar, preferably 4 to 15, most preferably 4 to 7. Preferably, the ratio of the volume of gas ($Q_g$) to the volume of liquid ($Q_l$) passing through the gas blast or gas assist nozzle is in the range 0.5:1 to 50:1, preferably 1:1 to 10:1 (where the ratio of the volume of gas ($Q_g$) to the volume of liquid ($Q_l$) is determined at the desired reaction temperature and pressure).

A plurality of high shear mixing zones, in particular, injector-mixing nozzles, may discharge into a single reactor vessel as described in WO 0138269 (PCT patent application number GB 0004444).

Where the reactor vessel of the Fischer-Tropsch synthesis unit is a tank reactor, suspension may be withdrawn from the tank reactor and is preferably at least in part recycled to a high shear mixing zone(s) through an external conduit via a mechanical pumping means, for example, a slurry pump, positioned in the external conduit. Owing to the exothermic nature of the Fischer-Tropsch synthesis reaction, the suspension recycle stream is preferably cooled by means of a heat exchanger positioned on the external conduit (hereinafter "external heat exchanger"). Additional cooling may be provided by means of an internal heat exchanger comprising cooling coils, tubes or plates positioned within the suspension in the tank reactor. It is also envisaged that cooling may be provided solely by means of the internal heat exchanger.

Preferably, the ratio of the volume of the external conduit (excluding the volume of the external heat exchanger) to the volume of the tank reactor is in the range of 0.005:1 to 0.2:1.

Preferably, where the reactor vessel of the Fischer-Tropsch synthesis unit is a tank reactor, the reactor is arranged with its longitudinal axis substantially parallel to the surface of the deck of the floatable structure. This has an advantage, where the structure is floating, of improving the stability of the floating structure by lowering the centre of gravity of the reactor system. This also reduces the susceptibility of the operation of the process of the present invention to the pitch and roll of the floating structure. Preferably, there is sufficient clearance between the tank reactor and the deck of the floating structure, especially where the structure is a ship, to allow waves to crash over the deck. Where the tank reactor is arranged with its longitudinal axis substantially parallel to the surface of the deck of the floating structure, the high shear mixing zone(s) may discharge its contents into the tank reactor along the direction of the longitudinal axis of the tank reactor. Alternatively, a series of high shear mixing zones may be arranged along the reactor vessel and discharge their contents radially inwardly into the tank reactor.

Where the Fischer-Tropsch synthesis unit comprises at least one high shear mixing zone, a tank reactor and external conduit, the process of the present invention is preferably operated with an average residence time in the system of the liquid component of the suspension of between 10 minutes and 50 hours, preferably 1 to 30 hours. Suitably, the gas residence time in the high shear mixing zone(s), for example, the injector-mixing nozzle(s), is in the range 20 milliseconds to 2 seconds, preferably 50 to 250 milliseconds. Suitably, the gas residence time in the tank reactor is in the range 10 to 240 seconds, preferably 20 to 90 seconds. Suitably, the gas residence time in the external conduit is in the range 10 to 180 seconds, preferably 25 to 60 seconds.

For practical reasons the tank reactor of the Fischer-Tropsch synthesis unit may not be totally filled with suspension during the process of the present invention so that above a certain level of suspension a gas cap containing unconverted synthesis gas is present in the top of the tank reactor. Suitably, the volume of the gas cap is not more than 40%, preferably not more than 30% of the volume of the tank reactor. The high shear mixing zone(s) may discharge into the tank reactor either above or below the level of suspension in the tank reactor, preferably, below the level of the suspension.

Where the tank reactor of the Fischer-Tropsch synthesis unit has a gas cap, a gaseous recycle stream may be withdrawn from the gas cap and may be recycled to the high shear mixing zone(s) as described in WO 0138269 (PCT patent application number GB 0004444). A purge stream may be removed from the gaseous recycle stream as described in WO 0138269 (PCT patent application number GB 0004444).

Where the reactor vessel is a tubular loop reactor, the high shear mixing zone(s) may be an injector mixing nozzle, for example, of the types described above, which discharge their contents into the tubular loop reactor. Alternatively, the high shear mixing zone(s) may comprise at least one section of the tubular loop reactor containing a venturi plate. Preferably, synthesis gas is introduced into the section(s) of the tubular loop reactor downstream of the venturi plate, for example, within 1 metres, preferably, within 0.5 metres of the venturi plate. In these arrangements, the suspension is circulated through the tubular loop reactor via a mechanical pumping means, for example, a slurry pump positioned therein. The high shear mixing zone(s) may also comprise at least one section of the tubular loop conduit containing a high shear pumping means, for example, a paddle or propeller having high shear blades. A gaseous stream comprising synthesis gas is injected into the section(s) of the tubular loop reactor, for example, via a sparger, either upstream or downstream, preferably upstream of the high shear pumping means. Preferably, the synthesis gas is injected into the tubular loop reactor within 1 metre, preferably within 0.5 metres of the high shear pumping means. Without wishing to be bound by any theory, the high shear pumping means breaks down the gaseous stream into gas bubbles and/or irregularly shaped gas voids.

Where the Fischer-Tropsch synthesis unit comprises at least one high shear mixing zone and a tubular loop reactor, the process of the present invention is preferably operated with an average residence time in the system of the liquid component of the suspension of between 10 minutes and 50 hours, preferably 1 to 30 hours. Suitably, the gas residence time in the high shear mixing zone(s) is in the range 20 milliseconds to 2 seconds, preferably 50 to 250 milliseconds. Suitably, the gas residence time in the tubular loop reactor (excluding any internal high shear mixing zone(s)) is in the range 10 to 420 seconds, preferably 20 to 240 seconds.

Suitably, the suspension present in the tubular loop reactor may be cooled by means of an external heat exchanger, for example, a cooling jacket and/or by means of an internal heat exchanger (for example, cooling coils, tubes or plates) located within at least a section of the tubular loop reactor).

Suitably, the tubular loop reactor is arranged in a substantially horizontal plane relative to the deck of the floatable structure. This has an advantage where the structure is floating of reducing the susceptibility of the operation of the process of the present invention to the pitch and roll of the floating structure.

Preferably, the tubular loop reactor is operated without a gas cap in order to mitigate the risk of slug flow. Where a gas cap is omitted, suspension together with entrained gases (gas bubbles and/or irregularly shaped gas voids) and/or dissolved gases may be withdrawn from the tubular loop reactor and may be passed to a gas separation zone where the gases are separated from the suspension. Suitably, the catalyst is maintained in suspension in the gas separation zone by means of a by-pass loop conduit having a mechanical pumping means located therein. Thus, suspension is continuously withdrawn from the gas separation zone and is, at least part, recycled to the gas separation zone through the by-pass loop conduit. The separated gases may be recycled to the high shear mixing zone(s) (gaseous recycle stream) as described in WO 0138269 (PCT patent application number GB 0004444). A purge stream may be taken from the gaseous recycle stream as described in WO 0138269 (PCT patent application number GB 0004444).

Preferably, a stream comprising low boiling hydrocarbon(s) (for example pentanes, hexanes or hexenes) may be introduced into the high shear mixing zone(s) and/or the reactor vessel (tank reactor or tubular loop reactor) of the Fischer-Tropsch synthesis unit as described in WO 0138269 (PCT patent application number GB 0004444).

Suitably, the carbon monoxide conversion (to liquid hydrocarbon products) in the Fischer-Tropsch synthesis unit is in the range 1 to 95%, more preferably, 30 to 90%, most preferably, at least 50%, for example, at least 65%.

Suitably, the kinetic energy dissipation rate in the high shear mixing zone(s) of the Fischer-Tropsch synthesis unit is at least 0.5 kW/m$^3$ relative to the total volume of suspension present in the system, preferably in the range 0.5 to 25 kW/m$^3$, more preferably 0.5 to 10 kW/m$^3$, most preferably 0.5 to 5 kW/m$^3$, and in particular, 0.5 to 2.5 kW/m$^3$ relative to the total volume of suspension present in the system. Without wishing to be bound by any theory it is believed that when kinetic energy is dissipated to the suspension present in the high shear mixing zone(s) at a rate of at least 0.5 kW/m$^3$ relative to the total volume of suspension present in the system, the rate of mass transfer of synthesis gas to the suspension is enhanced.

Suitably, in the process of the present invention, the volumetric mass transfer rate is in the range 2 to 10,000, preferably, 25 to 1000, more preferably 5 to 100 kg-moles/h of carbon monoxide transferred per m$^3$ of suspension. Suitably, in the process of the present invention, the mass transfer rate is in the range $5 \times 10^{-3}$ to $5 \times 10^{-6}$ kg-moles carbon monoxide transferred per m$^2$ of bubble and/or irregularly shaped void surface area per hour.

Preferably, the higher hydrocarbons produced in the process of the present invention comprise a mixture of hydrocarbons having a chain length of greater than 2 carbon atoms, for example, greater than 5 carbon atoms. Suitably, the higher hydrocarbons comprise a mixture of hydrocarbons having chain lengths of from 5 to about 90 carbon atoms. Preferably, a major amount, for example, greater than 60% by weight, of the higher hydrocarbons have chain lengths of from 5 to 30 carbon atoms. Suitably, the liquid medium comprises one or more of the higher hydrocarbons produced in the process of the present invention which are liquid under the process conditions.

The catalyst which may be employed in the Fischer-Tropsch synthesis unit is any catalyst known to be active in Fischer-Tropsch synthesis. For example, Group VIII metals whether supported or unsupported are known Fischer-Tropsch catalysts. Of these iron, cobalt and ruthenium are preferred, particularly iron and cobalt, most particularly cobalt. Suitable catalysts are as described in WO 0138269 (PCT patent application number GB 0004444).

Preferably, the catalyst employed in the Fischer-Tropsch synthesis unit may have a particle size in the range 5 to 500 microns, more preferably 5 to 100 microns, most preferably, in the range 5 to 30 microns.

Preferably, the suspension of catalyst employed in the Fischer-Tropsch synthesis unit comprises less than 40% wt of catalyst particles, more preferably 10 to 30% wt of catalyst particles, most preferably 10 to 20% wt of catalyst particles.

Carbon dioxide may be present in the synthesis gas produced in the synthesis gas production unit, arising from the natural gas feedstock or as a by-product of the synthesis gas production process. Carbon dioxide may be separated from the synthesis gas, for example, in a carbon dioxide absorption unit, before feeding the synthesis gas to the Fischer-Tropsch synthesis unit. However, it is envisaged that the process of the present invention may be operated without separating carbon dioxide from the synthesis gas. Thus, the synthesis gas which is fed to the Fischer-Tropsch synthesis unit may contain up to 50% by volume of carbon dioxide, preferably up to 40% by volume of carbon dioxide, most preferably up to 30% by volume of carbon dioxide, for example up to 20% by volume of carbon dioxide. Where the synthesis gas contains high amounts of carbon dioxide, the catalyst used in the Fischer-Tropsch synthesis unit should be stable in the presence of carbon dioxide. Preferred catalysts which are stable in the presence of carbon dioxide include cobalt on an inorganic oxide support selected from the group consisting of silica, alumina, silica-alumina and zinc oxide, in particular, zinc oxide.

The Fischer-Tropsch synthesis step of the process of the present invention is preferably carried out at a pressure of 5–100 bar, more preferably 10–50 bar, most preferably 15–35 bar, generally 20–30 bar.

The Fischer-Tropsch synthesis step of the process of the present invention is preferably carried out at a temperature in the range 180 to 350° C.

Preferably, the Fischer-Tropsch synthesis unit of the process of the present invention is operated with a gas hourly space velocity (GHSV) in the range 100 to 40000 $h^{-1}$, more preferably 1000 to 30000 $h^{-1}$, most preferably 2000 to 15000, for example 4000 to 10000 $h^{-1}$ at normal temperature and pressure (NTP) based on the feed volume of synthesis gas at NTP.

The higher hydrocarbons produced in the Fischer-Tropsch synthesis unit when operating the process of the present invention may be separated from the suspension, purified and optionally hydrocracked in a hydrocracker unit, all as described in WO 0138269 (PCT patent application number GB 0004444). Suitably, the hydrocracker unit may be located aboard the floatable structure. For avoidance of doubt, the higher hydrocarbons may be hydrocracked and/or hydroisomerised in the hydrocracker unit (hereinafter referred to as "hydroprocessing").

In order to facilitate transportation of the system, it is envisaged that the units of the system (i.e. the gas separation unit, the absorption unit, the synthesis gas production unit, the Fischer-Tropsch synthesis unit and the hydrocracker unit) may be installed on separate floatable structures. However, it is also envisaged that two or more of the units may be co-located on a floatable structure. Gaseous streams (e.g. natural gas from the gas separation units and synthesis gas from the synthesis gas production unit) and liquid streams (e.g. higher hydrocarbons from the Fischer-Tropsch synthesis unit) may be fed between the separate floatable structure via flow lines.

It is envisaged that the higher hydrocarbons, produced in the Fischer-Tropsch synthesis unit when operating the process of the present invention, may be blended with any crude oil which is produced alongside the natural gas and thus may be shipped therewith. Preferably, the higher hydrocarbons are subjected to hydroprocessing in the hydrocracker unit before being blended with the crude oil. Alternatively, the higher hydrocarbons may be passed to separate product tanks for separate marketing/refining. Preferably, the higher hydrocarbons are subjected to hydroprocessing in the hydrocracker unit before being passed to the separate product tanks.

Suitably, unconverted synthesis gas from the Fischer-Tropsch synthesis unit and/or natural gas from the gas processing plant may be utilized for production of electrical power in an electrical generator and the electricity thereby generated can be used, for example, in the operation of the offshore plant.

EXAMPLE

The weight of a floating 30,000 barrel per day commercial plant according to the present invention comprising a synthesis gas production unit and two Fischer-Tropsch synthesis units (Plant A) was compared with that of a floating 30,000 barrel per day commercial plant comprising an identical synthesis gas production unit and three Fischer-Tropsch synthesis units each comprising a conventional slurry bubble column (Plant B). The two Fischer-Tropsch synthesis units of Plant A each comprise an injector mixing nozzle, a tank reactor and an external conduit. It was found that the total calculated weight of Plant A was 45645 short tons compared with a total calculated weight of 49626 short tons for Plant B i.e. a weight reduction of 8%.

TABLE 1

Weight of Plants A and B

| | Weight (short tons)[1] |
|---|---|
| Weight of Plant A | 45,645 |
| Weight of Plant B | 49,626 |
| Weight Reduction | 8% |
| Weight of Plants A and B includes all: | |
| equipment weight | |
| structural steel | |
| bulks (pipes, electrical cabling, instrumentation, insulation, paint) | |
| catalyst | |

[1] 1 short ton = 2000 lbs

The invention claimed is:

1. A process for the conversion of natural gas to higher hydrocarbons in a system comprising (1) a synthesis gas production unit and (2) a Fischer-Tropsch synthesis unit comprising at least one high shear mixing zone and a reactor vessel wherein the units are located aboard a floatable structure, said process comprising the steps of:
   (a) converting the natural gas to synthesis gas in the synthesis gas production unit; and
   (b) converting the synthesis gas to higher hydrocarbons, at an elevated temperature and pressure, in the Fischer-Tropsch synthesis unit by (i) passing synthesis gas and a suspension comprising a particulate Fischer-Tropsch catalyst suspended in a liquid medium through the high shear mixing zone(s) wherein the synthesis gas is broken down into gas bubbles and/or irregularly shaped gas voids which are dispersed in the suspension, and (ii) discharging suspension containing the dispersed gas bubbles and/or irregularly shaped gas voids from the high shear mixing zone(s) into the reactor vessel.

2. A process as claimed in claim 1 wherein the floatable structure is selected from the group consisting of platforms, jackups, Floating Production, Storage and Offloading (FPSO) units, ships, Floating Storage Units (FSU) and semisubmersible platforms.

3. A process as claimed in claim 1 wherein the system is located on a deck of the floatable structure.

4. A process as claimed in claim 1 wherein the structure is floating or is beached in shallow waters.

5. A process as claimed in claim 1 wherein the floatable structure is a ship having storage compartments for the higher hydrocarbons and the ship can be moored to an underwater loading buoy.

6. A process as claimed in claim 1 wherein the system comprises a gas separation unit wherein natural gas is separated from a well stream produced from an offshore oil or gas field.

7. A process as claimed in claim 1 wherein the system comprises an absorption unit wherein sulfur compounds are removed from the natural gas prior to feeding the natural gas the synthesis gas production unit.

8. A process as claimed in claim 1 wherein at least one of the units of the system is located on a separate floatable structures.

9. A process as claimed in claim 1 wherein the volume of the reactor vessel of the Fischer-Tropsch synthesis unit is less than 1325 m$^3$ for a plant having a liquid capacity of 5,000 to 15,000 barrels per day.

10. A process as claimed in claim 1 wherein the kinetic energy dissipation rate in the high shear mixing zone(s) of the Fischer-Tropsch synthesis unit is 0.5 to 10 kW/m$^3$ relative to the total volume of suspension present in the system.

11. A process as claimed in claim 10 wherein the volumetric mass transfer rate is in the range 5 to 100 kg-moles/h of carbon monoxide transferred per m$^3$ of suspension.

12. A process as claimed in claim 10 wherein the mass transfer rate is in the range $5 \times 10^{-3}$ to $5 \times 10^{-6}$ kg-moles carbon monoxide transferred per m$^2$ of bubble and/or irregularly shaped void surface area per hour.

13. A process as claimed in claim 1 wherein at least a portion of the synthesis gas is broken down into gas bubbles having diameters in the range of from 30 μm to 3000 μm.

14. A process as claimed in claim 1 wherein the irregularly shaped gas voids are coalescing and fragmenting on a time scale of up to 500 ms.

15. A process as claimed in claim 1 wherein the reactor vessel of the Fischer-Tropsch synthesis unit is a tank reactor or a tubular loop reactor.

16. A process as claimed in claim 1 wherein the high shear mixing zone(s) is an injector-mixing nozzle(s).

17. A process as claimed in claim 16 wherein the injector-mixing nozzle(s) is executed as a venturi nozzle(s) having a pressure drop of the suspension over the venturi nozzle(s) in the range of from 2 to 15 bar and wherein the ratio of the volume of gas ($Q_g$) to the volume of liquid ($Q_l$) passing through the venturi nozzle(s) is in the range 1:1 to 5:1 where the ratio of the volume of gas ($Q_g$) to the volume of liquid ($Q_l$) is determined at the desired reaction temperature and pressure.

18. A process as claimed in claim 16 wherein the injector mixing nozzle(s) is executed as a gas blast nozzle(s) having a pressure drop of gas over the nozzle(s) in the range 3 to 100 bar and a pressure drop of suspension over the nozzle(s) in the range of from 4 to 15 bar and wherein the ratio of the volume of gas ($Q_g$) to the volume of liquid ($Q_l$) passing through the gas blast nozzle(s) is in the range 1:1 to 10:1 where the ratio of the volume of gas ($Q_g$) to the volume of liquid ($Q_l$) is determined at the desired reaction temperature and pressure.

19. A process as claimed in claim 16 wherein the injector mixing nozzle(s) comprises a high shear pumping means positioned within an open ended conduit and synthesis gas is injected into the conduit immediately upstream or downstream of the high shear pumping means.

20. A process as claimed in claim 1 wherein the reactor vessel of the Fischer-Tropsch synthesis unit is a tank reactor, a suspension recycle stream is withdrawn from the tank reactor and is at least in part recycled to a high shear mixing zone(s) through an external conduit having a mechanical pumping means positioned therein.

21. A process as claimed in claim 20 wherein the suspension recycle stream is cooled by means of a heat exchanger positioned on the external conduit and optionally the suspension is cooled within the tank reactor by means of an internal heat exchanger.

22. A process as claimed in claim 15 wherein the tank reactor is arranged with its longitudinal axis substantially parallel to the surface of the deck of the floatable structure.

23. A process as claimed in claim 22 wherein the high shear mixing zone(s) discharges its contents into the tank reactor along the direction of the longitudinal axis of the tank reactor or a series of high shear mixing zones are arranged along the tank reactor and discharge their contents radially inwardly into the tank reactor.

24. A process as claimed in claim 15 wherein the tank reactor has a gas cap above the level of suspension, the high shear mixing zone(s) discharge into the tank reactor either above or below the level of suspension and a gaseous recycle stream is recycled from the gas cap to the high shear mixing zone(s).

25. A process as claimed in claim 15 wherein the reactor vessel of the Fischer-Tropsch synthesis unit is a tubular loop reactor and the high shear mixing zone(s) comprises a section of the tubular loop reactor containing a venturi plate and synthesis gas is introduced into the section of the tubular loop reactor immediately downstream of the venturi plate.

26. A process as claimed in claim 15 wherein the reactor vessel is a tubular loop reactor and the high shear mixing zone(s) is a section of the tubular loop reactor containing a high shear pumping means and synthesis gas is injected into the section of the tubular loop reactor within 0.5 meters of the high shear pumping means.

27. A process as claimed in claim 15 wherein the tubular loop reactor is operated without a gas cap, a suspension product stream comprising suspension and entrained gases is withdrawn from the tubular loop reactor and is passed to a gas separation zone where the entrained gases are separated from the suspension and at least a portion of the separated gases are recycled to the high shear mixing zone(s).

28. A process as claimed in claim 15 wherein the tubular loop reactor is arranged in a substantially horizontal plane relative to the deck of the floatable structure.

29. A process as claimed in claim 1 wherein the average residence time of the liquid component of the suspension in the reactor system of the Fischer Tropsch synthesis unit is between 1 to 30 hours.

30. A process as claimed in claim 1 wherein a stream comprising a vaporizable low boiling solvent is introduced into the high shear mixing zone(s) and/or the reactor vessel of the Fischer-Tropsch synthesis unit.

31. A process as claimed in claim 1 wherein the catalyst employed in the Fischer-Tropsch synthesis unit has a particle size in the range 5 to 100 microns.

32. A process as claimed in claim 1 wherein the synthesis gas which is fed to the Fischer-Tropsch synthesis unit contains up to 50% by volume of carbon dioxide.

33. A process as claimed in claim 1 wherein the Fischer-Tropsch synthesis production unit is operated with a gas hourly space velocity (GHSV) in the range 1000 to 30000 h$^{-1}$, at normal temperature and pressure (NTP) based on the feed volume of synthesis gas at NTP.

34. A process as claimed in claim 7 wherein unconverted synthesis gas from the Fischer-Tropsch synthesis unit and/or natural gas from the gas separation unit may be utilized for production of electrical power in an electrical generator and the electricity thereby generated is used in the operation of the system.

35. A process as claimed in claim 2 wherein the floatable structure is a production vessel or a storage vessel.

* * * * *